United States Patent [19]

Mizoguchi et al.

[11] Patent Number: 5,566,226
[45] Date of Patent: Oct. 15, 1996

[54] PORTABLE TELEPHONE APPARATUS WHICH CAN BE CONNECTED TO AN EXTERNAL APPARATUS WITHOUT USING AN ADAPTER

[75] Inventors: Tamiyuki Mizoguchi; Kohei Nishiyama; Masahiko Tanaka, all of Tokyo, Japan

[73] Assignee: NEC Corporation, Tokyo, Japan

[21] Appl. No.: 450,472

[22] Filed: May 26, 1995

[30] Foreign Application Priority Data

May 31, 1994 [JP] Japan .................................. 6-141055

[51] Int. Cl.⁶ ...................................... H04Q 7/32
[52] U.S. Cl. ............................. 379/58; 379/357
[58] Field of Search ........................... 379/52, 53, 58, 379/59, 110, 357

[56] References Cited

FOREIGN PATENT DOCUMENTS

| | | |
|---|---|---|
| 0619669 | 10/1994 | European Pat. Off. . |
| 0629071 | 12/1994 | European Pat. Off. . |
| 341043 | 11/1992 | Japan . |
| WO94/21058 | 9/1994 | WIPO . |

*Primary Examiner*—Curtis Kuntz
*Assistant Examiner*—Nay Aung Maung
*Attorney, Agent, or Firm*—Scully, Scott, Murphy & Presser

[57] ABSTRACT

For use in combination with a data processing apparatus (50) which is provided with a card connecting portion for connecting a card-shaped device therewith, a portable telephone apparatus (20) has a card-shaped portion which can be connected to the card connecting portion instead of the card-shaped device. The data processing apparatus is for processing a datum. When the card-shaped portion is connected to the card connecting portion, the datum can be transferred between the data processing apparatus and the card-shaped portion. Therefore, the portable telephone apparatus enables the data processing apparatus to carry out communication relating to the datum.

11 Claims, 9 Drawing Sheets

PORTABLE TELEPHONE APPARATUS WHICH CAN BE CONNECTED TO AN EXTERNAL APPARATUS WITHOUT USING AN ADAPTER

BACKGROUND OF THE INVENTION

This invention relates to a portable telephone apparatus which can be used in combination with a data processing apparatus, such as a personal computer or the like.

A recent technical development has brought a personal computer which is relatively small and which will be called hereunder a mobile computer. Generally, the mobile computer is designed so that it is possible to carry out data communication through a public communication network known in the art. On carrying out the data communication, a datum is transmitted between the personal computer and the public communication network and is processed by the personal computer. As a result, a user of the mobile computer can receive various services known in the art.

In addition, the mobile computer comprises a card connecting portion for connecting a card-shaped device which is generally called an IC memory card or a PC card. When the card-shaped device is connected to the card connecting portion, it becomes possible to transmit the datum between the data processing apparatus and the card-shaped device.

In order to carry out the data communication, it is necessary to connect the mobile computer with the public communication network. Recently, a proposal is made of using a portable telephone apparatus for connecting the mobile computer to the public communication network. For example, such a proposal is disclosed in Japanese Patent Prepublication No. 341,043 of 1992 by Masayuki Shimizu. As will later be described in detail with reference to the drawing, the proposal uses an adapter unit which is connected between the mobile computer and the portable telephone apparatus and is for establishing electrical matching therebetween. This results in enabling reception of the various services through the public communication network during movement of the mobile computer.

However, the adapter unit must always be carried together with the portable telephone apparatus and the mobile computer. In addition, a battery for the adapter unit must be carried. Taking the above into consideration, a portability is extremely inferior.

SUMMARY OF THE INVENTION

It is an object of this invention to provide a portable telephone apparatus which can be connected to a data processing apparatus without using an adapter unit and others.

It is another object of this invention to provide a portable telephone apparatus of the type described, which can be connected to the data processing apparatus instead of a card-shaped device, such as an IC memory card or a PC card.

Other objects of this invention will become clear as the description proceeds.

According to this invention, there is provided a portable telephone apparatus having a function for use in combination with a data processing apparatus which is for processing a datum. The data processing apparatus includes a card connecting portion which is for connecting a card-shaped device therewith to enable the datum to be transferred between the data processing apparatus and the card-shaped device. The portable telephone apparatus comprises a card-shaped portion for being connected to the card connecting portion instead of the card-shaped device. The card connecting portion enables the datum to be transferred between the data processing apparatus and the card-shaped portion when the card-shaped portion is connected to the card connecting portion. The portable telephone apparatus further comprises communication carrying out means connected to the card-shaped portion for carrying out communication relating to the datum.

DESCRIPTION OF THE PREFERRED EMBODIMENTS

Figure 1:
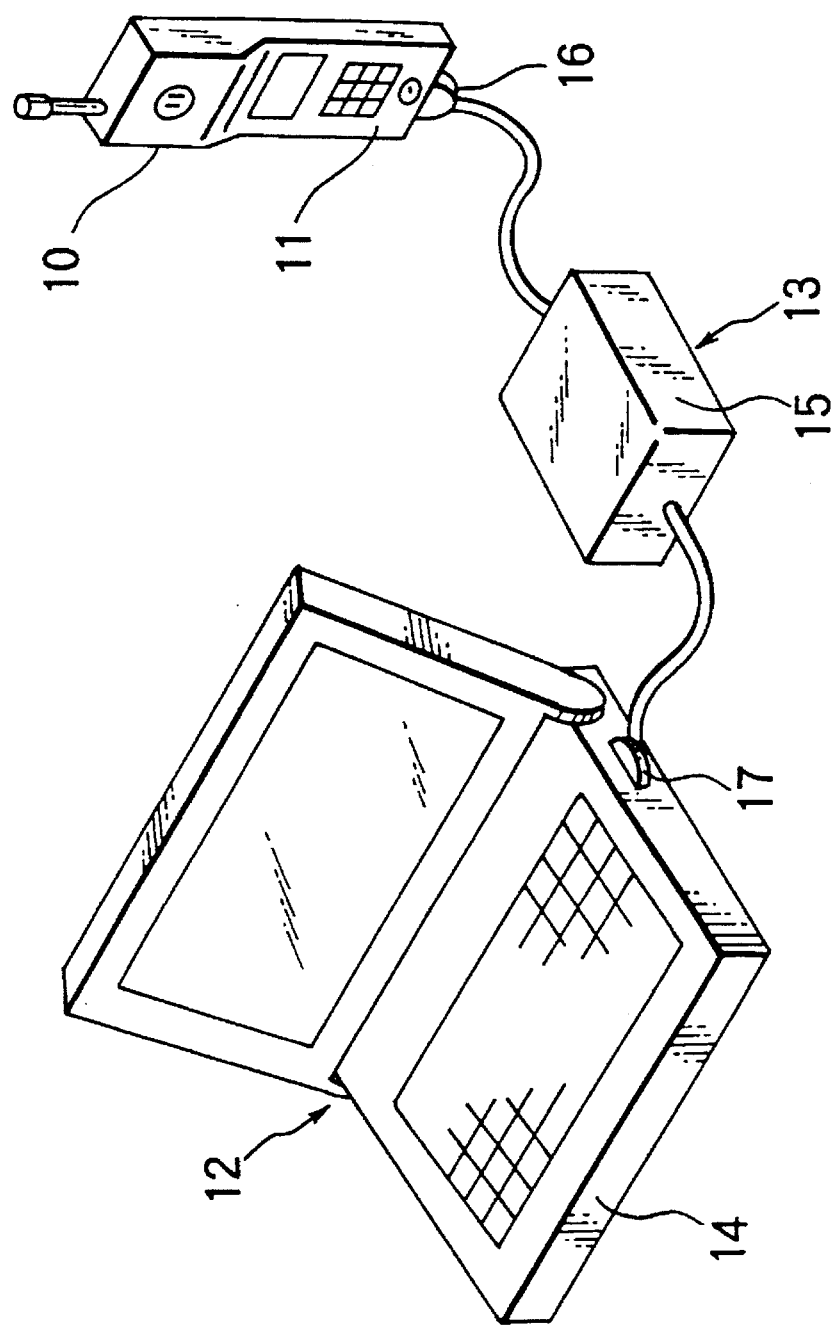
FIG. 1 is a perspective view of a combination of a conventional portable telephone apparatus, a data processing apparatus, and an adapter unit connected between the conventional portable telephone apparatus and the data processing apparatus.

Referring to FIG. 1, a conventional portable telephone apparatus will be described at first for a better understanding of the present invention. The conventional portable telephone apparatus is denoted by a reference numeral 10 and corresponds to the portable telephone apparatus that is described in the preamble part. The portable telephone apparatus comprises a telephone side case 11, a telephone circuit (not shown) contained in the telephone side case 11, and a telephone side connector (not shown) fixedly held to the telephone side case 11 and connected to the telephone circuit.

The portable telephone apparatus can be connected to a personal computer or a mobile computer 12 through an adapter unit 13. The personal computer 12 is relatively small and will be called hereunder a data processing apparatus. In the manner known in the art, the data processing apparatus 12 comprises a processing side case 14, a processing circuit (not shown) contained in the processing side case 14, and a processing side connector (not shown) fixedly held to the processing side case 14 and connected to the processing circuit.

The adapter unit 13 comprises an interface converter 15, a first adapter side connector 16, and a second adapter side connector 17. The first adapter side connector 16 is connected to the telephone side connector. The second adapter side connector 17 is connected to the processing side connector. Each of the first and the second adapter side connectors 16 and 17 can be disconnected from each of the telephone side and the processing side connectors by a user or an operator. The interface converter 15 is for establishing electrical matching between the telephone circuit and the processing circuit in a case where the portable telephone apparatus is connected to the data processing apparatus 12 through the adapter unit 13. Therefore, the data processing apparatus 12 can carry out data communication through the portable telephone apparatus in the manner which is similar to that of speech communication known in the art.

Figure 2:
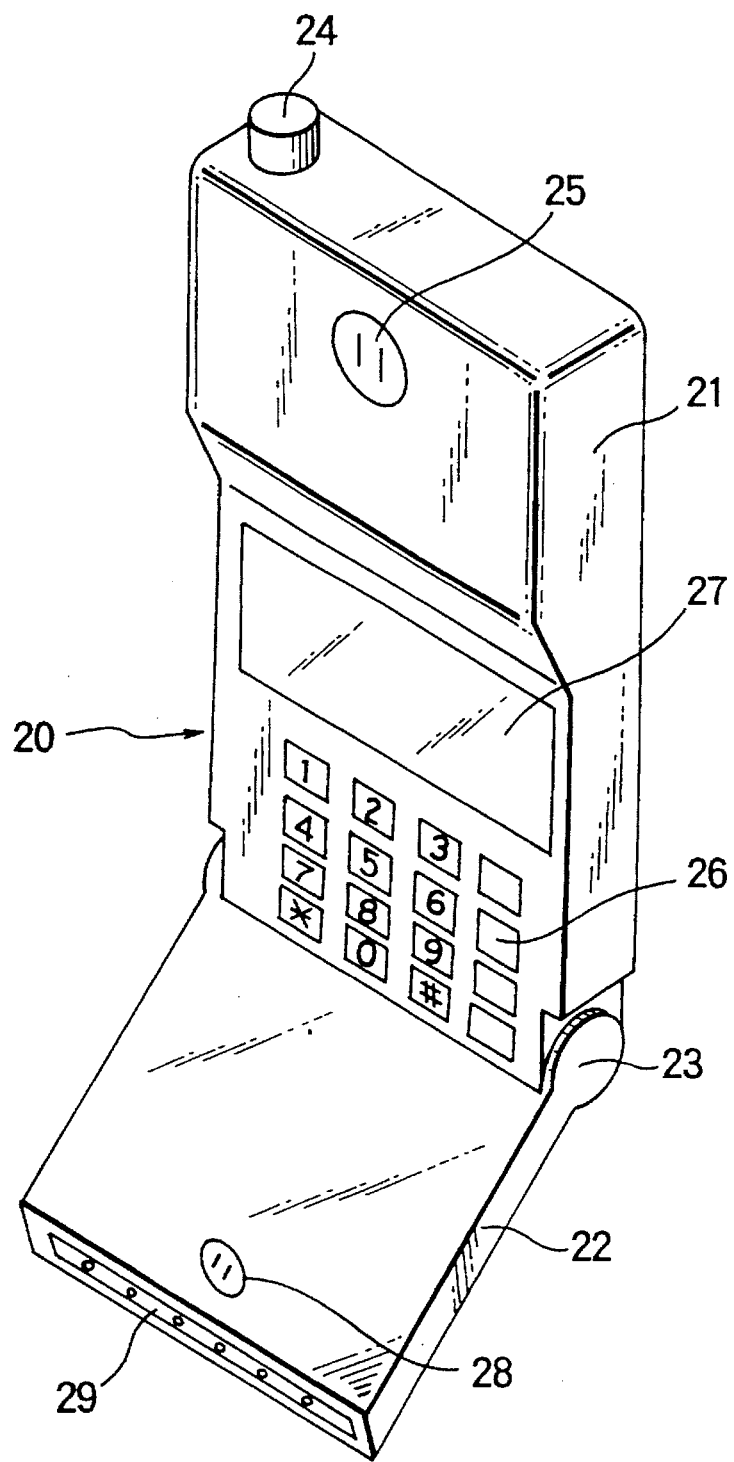
FIG. 2 is a perspective view of a portable telephone apparatus according to a first embodiment of this invention.

Turning to FIG. 2, description will be directed to a portable telephone apparatus according to a first embodiment of the instant invention. The portable telephone apparatus is denoted by a reference numeral 20 and is formed as a folding-type telephone apparatus known in the art. The portable telephone apparatus comprises a body or a main case 21 of a substantially flat shape and a subsidiary case 22 which is of a flat plate shape and which will be referred to as a card-shaped case. The subsidiary case 22 is pivotally connected to a lower end of the main case 21 by a hinge 23. As a result, the subsidiary case 22 is movable between a first position substantially straight with respect to the main case 21 and a second position projecting frontwardly from the main case 21 as exemplified in FIG. 2.

The main case 21 is provided with an antenna 24, a receiver or a loudspeaker 25, a key portion 26, and a display portion 27. The antenna 24 is for receiving a radio signal transmitted from a base station (not shown) which is connected to a public communication network known in the art. The receiver 25 is for generating an audible sound in response to reception of the radio signal in the manner which will later be described. The key portion 26 is operable as a manipulating portion for executing dialling and other key input operations known in the art. The display portion 27 comprises a numerical/character display such as a liquid crystal display or an indicator lamp such as an LED so as to visually display input information and control information in response to the key input operation at the key portion 26 or to the reception of the radio signal.

The subsidiary case 22 has a width and a thickness substantially equal to those of a PC card or an IC memory card which is recently brought into wide use and has a size designed in accordance with a predetermined standard, for example, a PCMCIA standard well known in the art. Namely, the size of the subsidiary case 22 is designed in accordance with the predetermined standard. It is noted here that the subsidiary case 22 has a length which is not specifically restricted but preferably equal to that of the PC card or the IC memory card. For convenience of the description, the PC card and the IC memory card are collectively called hereinunder a card-shaped device.

The description will shortly be made as regards the card-shaped device. The card-shaped device comprises an internal circuit and a device side connector which is connected to the internal circuit. The internal circuit and the device side connector are designed in accordance with the predetermined standard. In addition, the internal circuit comprises a COR register as a memory area defined by the predetermined standard.

Figure 3:
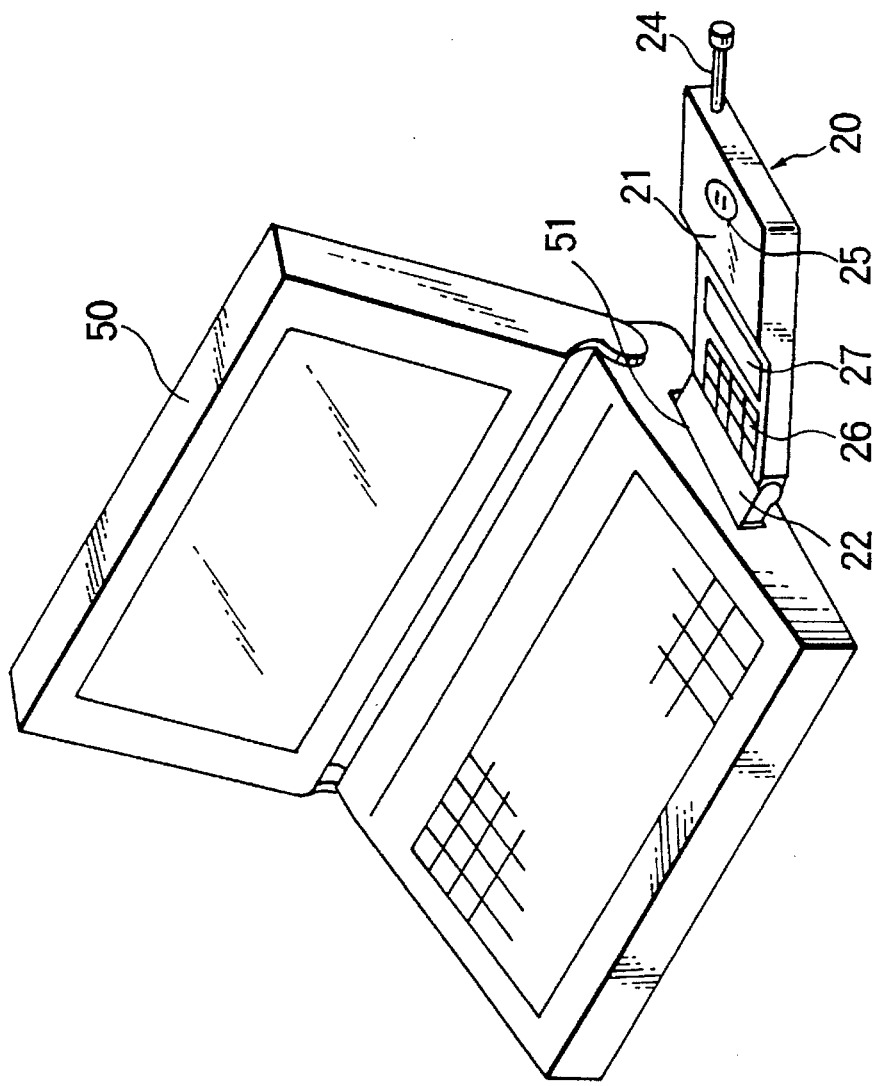
FIG. 3 is a perspective view of a combination of the data processing apparatus and the portable telephone apparatus illustrated in FIG. 2.

Referring to FIG. 3 shortly, a data processing apparatus 50 such as a personal computer or a mobile computer includes a card insertion slot 51 and a card connecting portion (not shown) placed in the card insertion hole 51. The card connecting portion is for being connected to the device connector with the card-shaped device inserted in the card insertion hole. When the device connector is connected to the card connecting portion, a datum can be transferred between the data processing apparatus and the card-shaped device in the manner known in the art.

Returning back to FIG. 2, the description will proceed to the portable telephone apparatus. The subsidiary case 22 is provided with a transmitter or a microphone 28 for converting a transmitting sound into a sound signal. In the manner which will later be described, the sound signal is further converted into a transmitting signal which is transmitted towards the base station through the antenna 24.

In addition, the subsidiary case 22 has a free end provided with a telephone side connector 29 which is generally called a PC card connector or a PCMCIA interface connector in the art. The telephone side connector 29 is connected to a telephone circuit which is included in the portable telephone apparatus and which will later be described in detail. The telephone-side connector 29 has a scale equivalent to that of the device side connector included in the above-mentioned card-shaped device. In other words, the telephone side connector 29 is also designed in accordance with the predetermined standard. Therefore, the telephone-side connector 29 can be connected to the card connecting portion of the data processing apparatus instead of the device side connector of the card-shaped device with the subsidiary case 22 inserted in the card insertion hole as illustrated in FIG. 3. A combination of the subsidiary case 22 and the telephone side connector 29 is referred to as a card-shaped portion.

Figure 4:
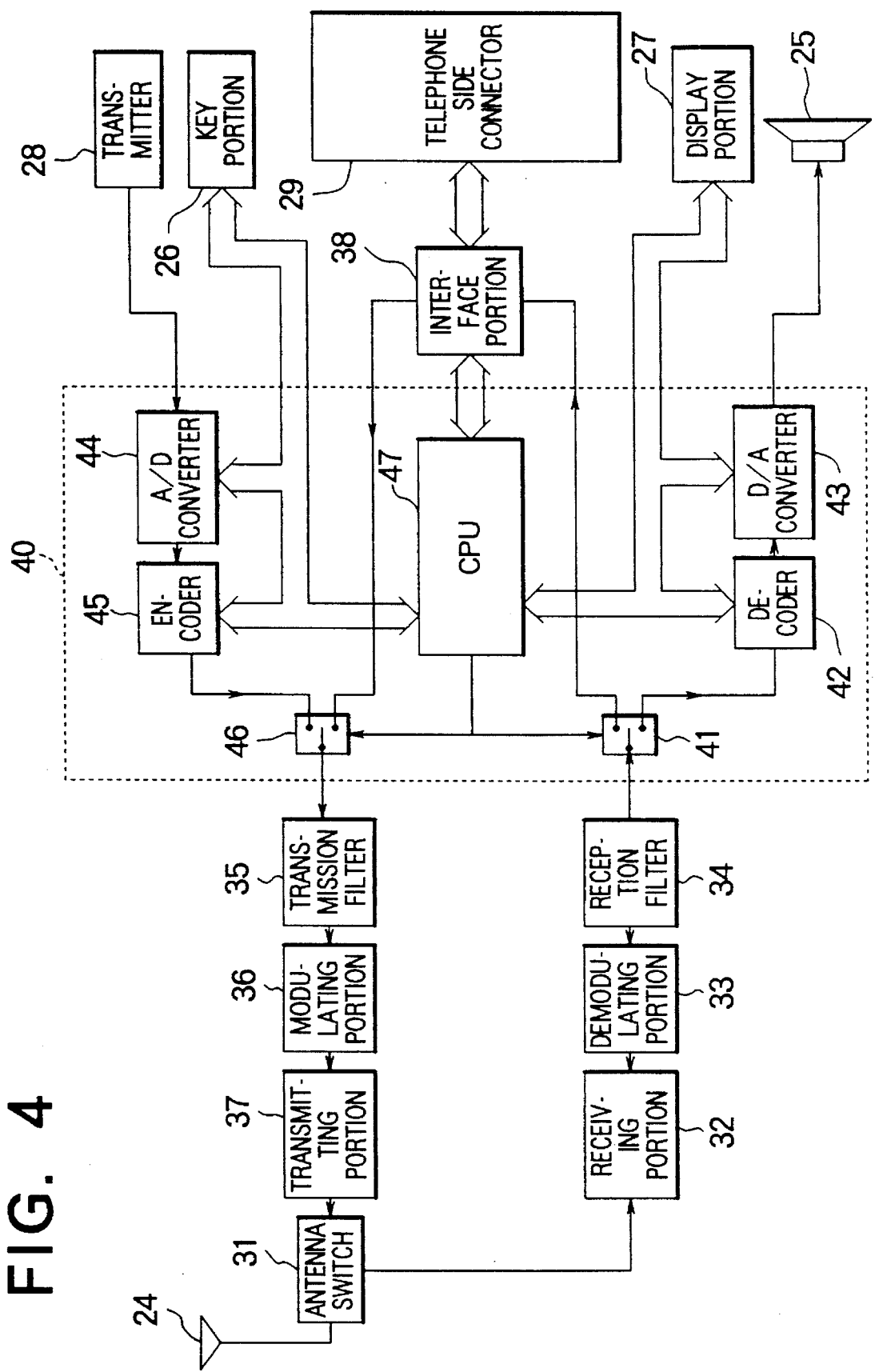
FIG. 4 is a block diagram of the portable telephone apparatus illustrated in FIG. 2.

Turning to FIG. 4, the description will be made as regards the telephone circuit. Similar parts corresponding to those in FIG. 2 are designated by like reference numerals.

In the manner which will presently be described in detail, the telephone circuit comprises an antenna switch 31, a receiving portion 32, a demodulating portion 33, a reception filter 34, a transmission filter 35, a modulating portion 36, a transmitting portion 37, and an interface portion 38. The antenna switch 31 is for connecting the antenna 24 with a selected one of the receiving and the transmitting portions 32 and 37. The receiving portion 32 is for receiving the radio signal through the antenna 24 and the antenna switch 31 to produce a reception-modulated signal. The demodulating portion 33 is connected to the receiving portion 32 and is for demodulating the reception-modulated signal into a reception-demodulated signal. The reception filter 34 is connected to the demodulating portion 33 and is for filtering the reception-demodulated signal into a reception-filtered signal. The transmission filter 35 is for filtering a local signal into a transmission-filtered signal. The local signal will later become clear. The modulating portion 36 is connected to the transmission filter 35 and is for modulating the transmission-filtered signal into a transmission-modulated signal. The transmitting portion 37 is connected to the modulating portion 36 and is for transmitting the transmission-modulated signal as the transmitting signal through the antenna switch 31 and the antenna 24. The interface portion 38 is connected to the telephone side connector 29 and is for carrying out a function which is similar to that of the internal circuit included in the abovementioned card-shaped device. In other words, the interface portion 38 is designed in accordance with the predetermined standard and comprises the COR register that is defined by the predetermined standard. By the use of the interface portion 38, it becomes possible to transfer the datum between the interface portion 38 and the data processing apparatus with the telephone side connector 29 connected to the card connecting portion of the data processing apparatus.

The telephone circuit further comprises a circuit control portion 40 which will be described in the following. The circuit control portion 40 comprises a reception switch 41, a decoder 42, a D/A converter 43, an A/D converter 44, an encoder 45, a transmission switch 46, and a central processing unit (CPU) 47. The reception switch 41 is for connecting the reception filter 34 with a selected one of the interface portion 38 and the decoder 42 under control by the CPU 47. When the reception filter 34 is connected to the interface portion 38, the reception filtered signal can be supplied as an input data signal to the interface portion 38. When the reception side filter 34 is connected to the decoder 42, the reception filtered signal can be supplied to the decoder 42. The decoder 42 is for decoding the reception-filtered signal into a decoded signal. The D/A converter 43 is connected to the decoder 42 and the receiver 25 and is for converting the decoded signal into an analogue signal which is supplied to the receiver 25 to make the receiver 25 generate the audible sound. The A/D converter 44 is connected to the transmitter 28 and is for converting the sound signal into a digital signal. The encoder 45 is connected to the A/D converter 44 and is for encoding the digital signal into an encoded signal. The transmission switch 46 is for connecting the transmission filter 35 with a selected one of the interface portion 38 and the decoder 42 under control by the CPU 47. When the transmission filter 35 is connected to the interface portion 38, an output data signal can be supplied as the local signal to the transmission filter 35 from the interface portion 38. When the transmission side filter 35 is connected to the encoder 45, the encoded signal can be supplied as the local signal to the transmission filter 35 from the encoder 45. The CPU 47 is for controlling the key portion 26, the display portion 27, the interface portion 38, the decoder 42, the D/A converter 43, the A/D converter 44, and the encoder 45 in addition to the reception switch 41 and the transmission switch 46. A combination of the interface portion 38 and the circuit control portion 40 is referred to as a communication carrying out arrangement.

Figure 5:
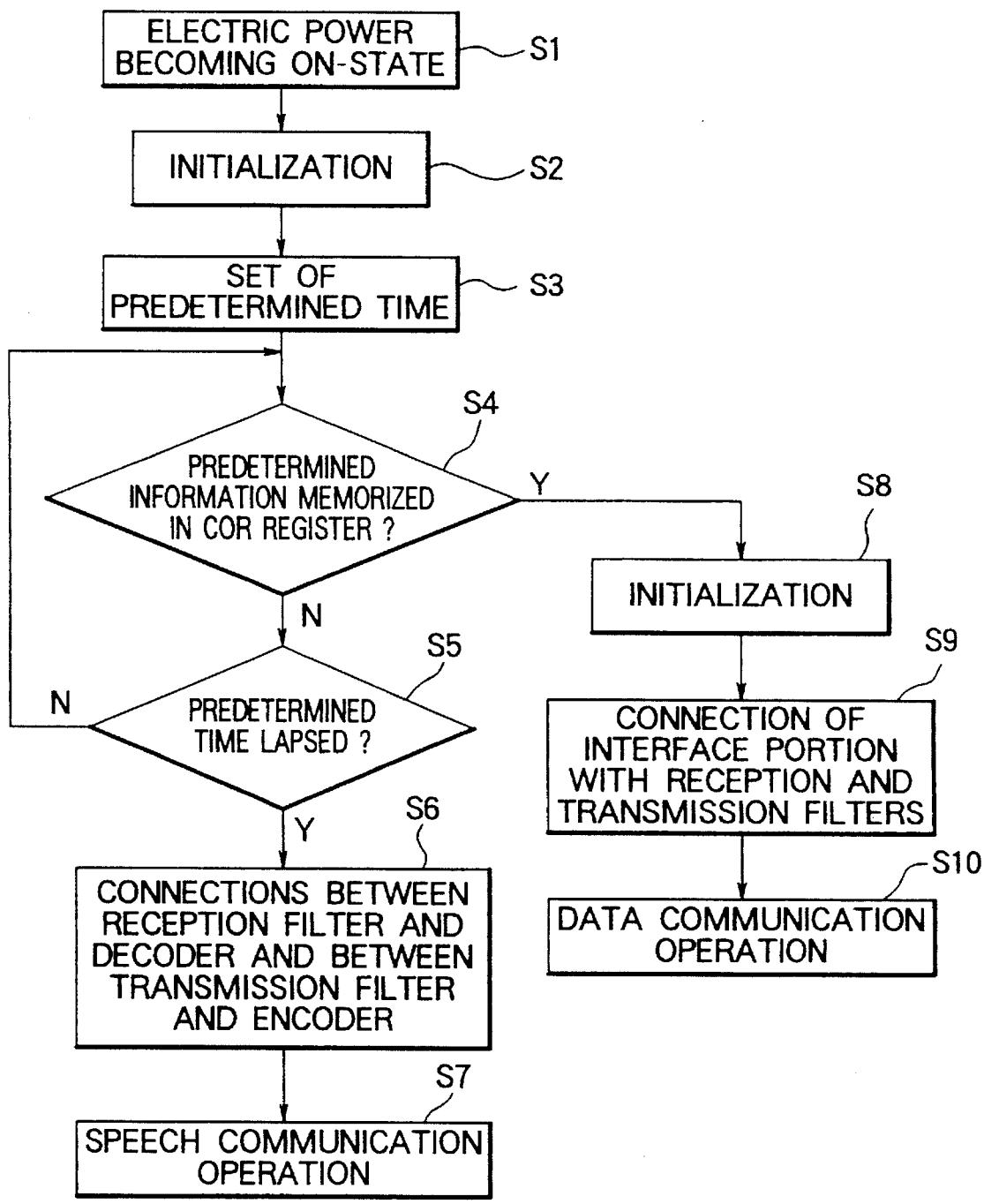
FIG. 5 is a flow chart for use in describing operation of the portable telephone apparatus illustrated in FIG. 2.

Referring to FIG. 5 together with FIG. 4, the description will be directed to operation of the portable telephone apparatus. In the manner known in the art, CIS information is memorized in a particular memory area defined by the PCMCIA standard. The CIS information is representative of a particular value. In the manner which is similar to that of a case where the card-shaped device is connected to the data processing apparatus, the data processing apparatus reads the CIS information from the particular memory area to make the particular value be memorized as predetermined information in the COR register of the interface portion 38 when the portable telephone apparatus is connected to the data processing apparatus.

After an electric power becomes an on-state, a first stage S1 is followed by a second stage S2 at which initialization is carried out as regards the interface portion 38. The second stage S2 is followed by a third stage S3 at which a timer is set with a predetermined time. The third stage S3 is followed by a fourth stage S4 at which judgement is made about whether or not the predetermined information is memorized in the COR register.

When the predetermined information is not memorized in the COR register, the fourth stage S4 proceeds to a fifth stage S5 at which judgement is made about whether or not the predetermined time has lapsed. When the predetermined time does not lapse, the fifth stage S5 returns to the fourth stage S4. When the predetermined time has lapsed, the fifth stage S5 proceeds to a sixth stage S6 at which the CPU 47 controls the reception and the transmission switches 41 and 46 so that the reception filter 34 is connected to the decoder 42 and that the transmission filter 35 is connected to the encoder 45. The sixth stage S6 is followed by a seventh stage S7 at which the speech communication can be carried out in the manner known in the art.

When the predetermined information is memorized in the COR register, the fourth stage S4 proceeds to an eighth stage S8 at which the initialization is carried out as regards the interface portion 38. The eighth stage S8 is followed by a ninth stage S9 at which the CPU 47 controls the reception and the transmission switches 41 and 46 so that the reception and the transmission filters 34 are connected to the interface portion 38. The ninth stage S9 is followed by a tenth stage S10 at which the data communication can be carried out in the manner which is similar to that of the speech communication and which will later be described.

Referring to FIGS. 2 through 4 again, the description will be made by the use of other words as regards a case where the data communication is carried out. In order to carry out the data communication, the portable telephone apparatus 20 is connected to the data processing apparatus 50. For this purpose, the portable telephone apparatus 20 is at first put into a state similar to that in the speech communication. Specifically, the subsidiary case 22 of the portable telephone apparatus 20 is opened by the hinge 23 with respect to the main case 21 as illustrated in FIG. 2. Then, as illustrated in FIG. 3, the top end of the subsidiary case 22 is inserted into the insertion slot 51 of the data processing apparatus 50.

When the top end of the subsidiary case 22 is inserted into the insertion slot 51, the telephone side connector 29 and the card connecting portion are coupled to each other to establish electrical connection therebetween. As a result, the telephone circuit is connected to a CPU included in the data processing apparatus 50. In this event, the CPU 47 recognizes that the portable telephone apparatus 20 is connected to the data processing apparatus 50 through the interface portion 38.

Subsequently, the CPU 47 is responsive to a communication control signal supplied from the data processing apparatus 50 and carries out setting of a card operation mode and control of activation of a radio channel to execute radio communication in the manner known in the art. Thus, the data communication is carried out with the portable telephone apparatus 20 directly connected to the data processing apparatus 50.

Upon the data communication, transmission or reception is carried out by manipulating the key portion 26 of the portable telephone apparatus 20 in a predetermined manner to start an operation process. In response to an indication from the key portion 26, the CPU 47 carries out radio channel control for the receiving and the transmitting portions 32 and 37 according to a predetermined step to establish the radio channel. Thereafter, the control portion controls an access to a data base (entry of an inquiry request/display of request entry information, display of a result responsive to the inquiry request, and the like). In this case, data base access information is displayed in the display section 27.

With the portable telephone apparatus 20, it is unnecessary to use the adapter unit illustrated by a reference numeral 13 in FIG. 1. This improves a portability of the apparatus and makes it possible to meet the needs for a radio data service characterized by "anytime/anywhere" as a mobile computing terminal.

Figure 6:
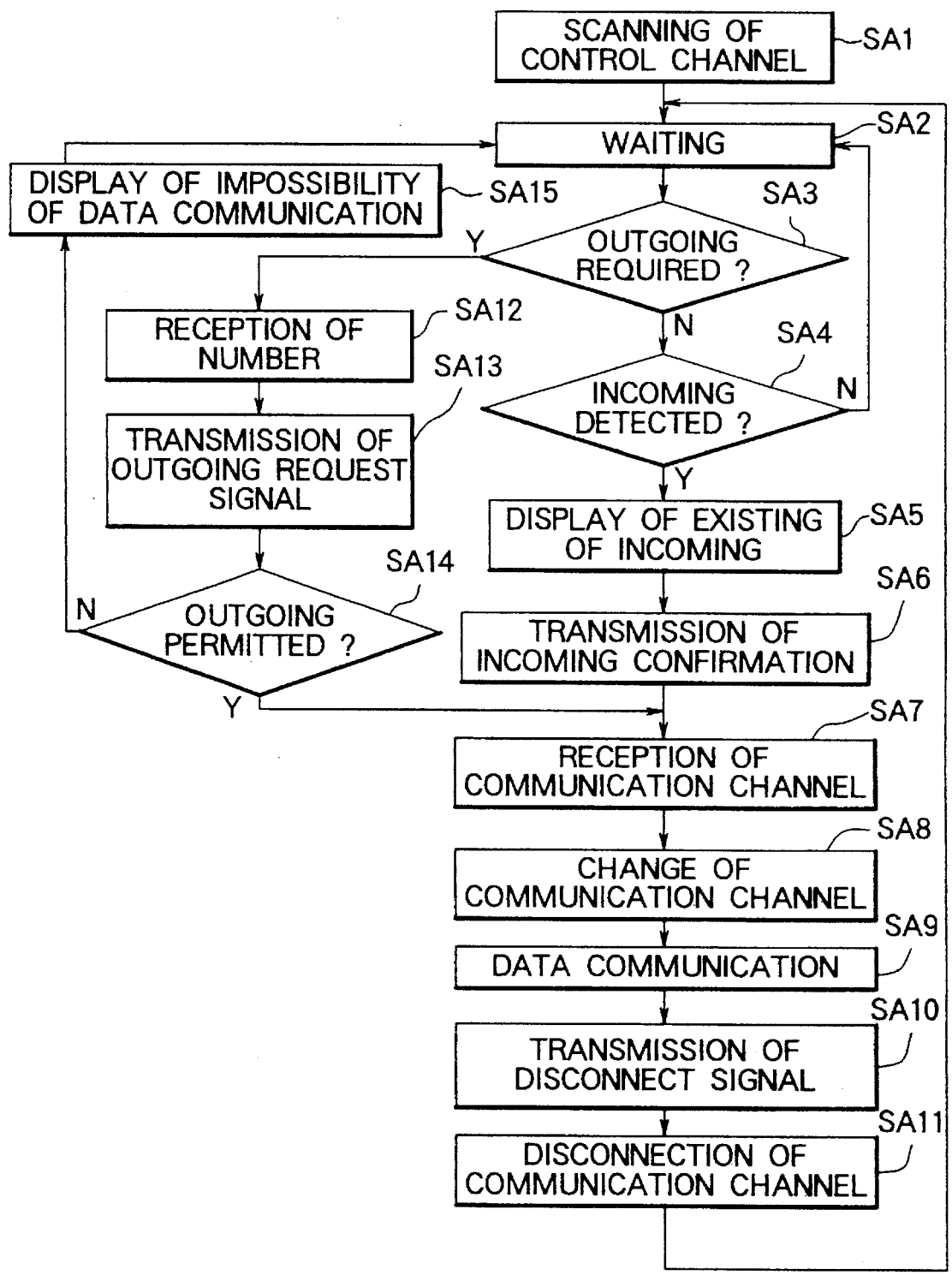
FIG. 6 is a flow chart for use in describing a data communication operation included in the flow chart of FIG. 5.

Referring to FIG. 6 together with FIGS. 2 and 4, the description will be directed to the data communication operation that is depicted in the tenth stage S10 of FIG. 5. At a first stage SA1, scanning is carried out about a control channel in the manner known in the art. The first stage SA1 is followed by a second stage SA2 at which the telephone apparatus is brought in a waiting state for waiting an outgoing and an incoming. The second stage SA2 is followed by a third stage SA3 at which judgement is carried out about whether or not the outgoing is required. When the outgoing is required, the portable telephone apparatus has operation which will later be described.

When the outgoing is not required, the third stage SA3 proceeds to a fourth stage SA4 at which judgement is carried out about whether or not the incoming is detected. When the incoming is not detected, the fourth stage SA4 returns to the second stage SA2. When the incoming is detected, the fourth stage SA4 proceeds to a fifth stage SA5 at which an existing of the incoming is displayed on the display portion 27. The fifth stage SA5 is followed by a sixth stage SA6 at which an incoming confirmation signal is transmitted through the antenna 24. The sixth stage SA6 is followed by a seventh stage SA7 at which a communication channel is received. The seventh stage SA7 is followed by an eighth stage SA8 at which the communication channel is changed. The eighth stage SA8 is followed by a ninth stage SA9 at which data communication is carried out in the manner known in the art. The ninth stage SA9 is followed by a tenth stage SA10 at which a disconnect signal is transmitted through the antenna 24. The tenth stage SA10 is followed by an eleventh stage SA11 at which the communication channel is disconnected. The eleventh stage SA11 is followed by the second stage SA2.

When the outgoing is required, the third stage SA3 proceeds to a twelfth stage SA12 at which a reception is carried out about a number which is given at the key portion 26. The twelfth stage SA12 is followed by a thirteenth stage SA13 at which an outgoing request signal is transmitted through the antenna 24. The thirteenth stage SA13 is followed by a fourteenth stage SA14 at which judgement is carried out about whether or not the outgoing is permitted. When the outgoing is permitted, the fourteenth stage SA14 proceeds to the seventh stage SA7. Otherwise, the fourteenth stage SA14 proceeds to a fifteenth stage SA15 at which impossibility of the data communication is displayed on the display portion 27. The fifteenth stage SA15 is followed by the second stage SA2.

Figure 7:
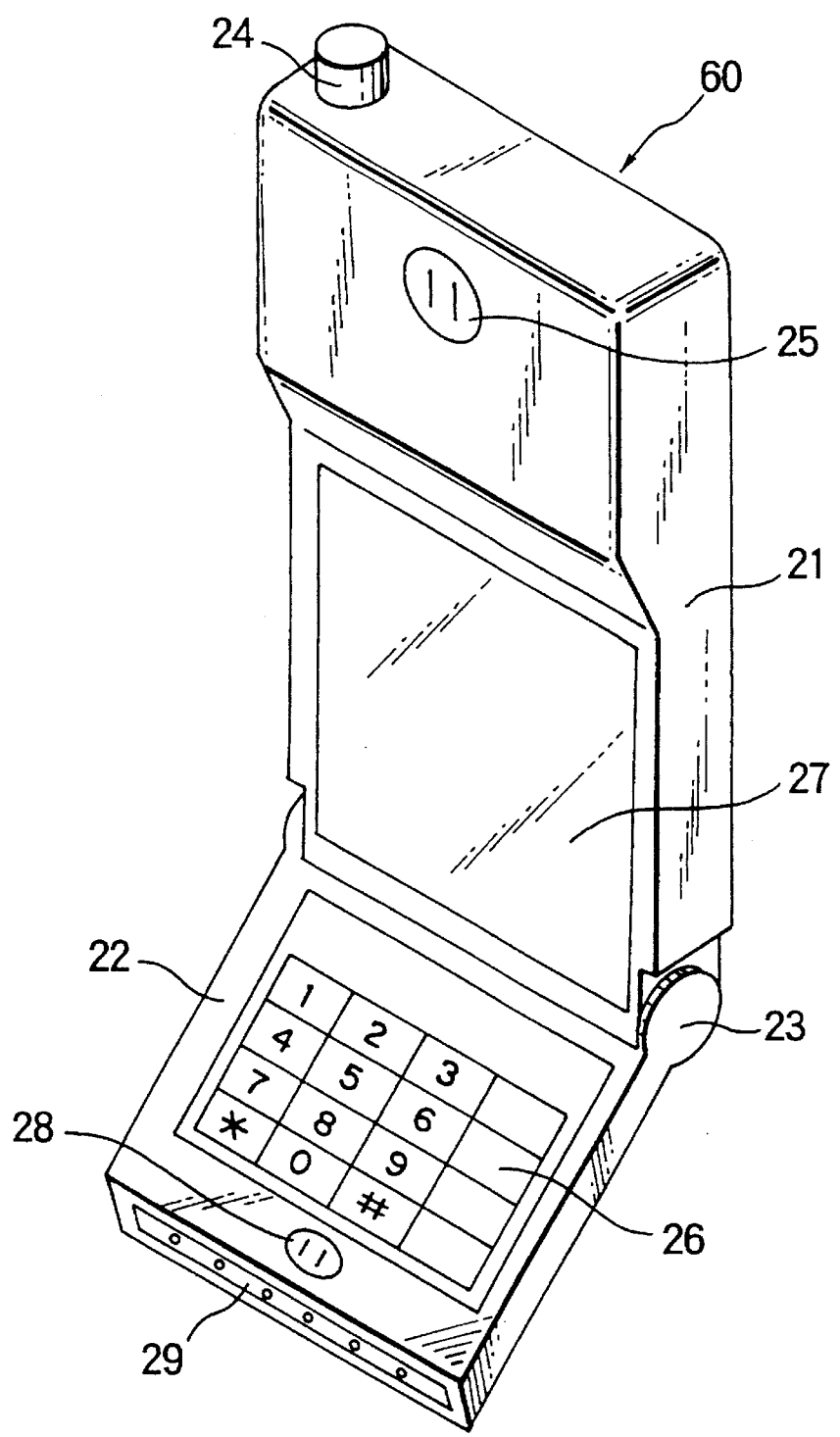
FIG. 7 is a perspective view of a portable telephone apparatus according to a second embodiment of this invention.

Turning to FIG. 7, the description will be directed to a portable telephone apparatus 60 according to a second embodiment of this invention. Similar parts are designated by like reference numerals. In the portable telephone apparatus 60, the key portion 26 is formed on the subsidiary case 22 to increase a surface area of the display portion 27 of the main case 21. Specifically, with the diversification of the mobile computing service, information displayed in the display section tends to be increased. If the surface area of the display section is small, a display content (characters and symbols) is restricted. It is therefore difficult to simultaneously display a required volume of the display content on the display section. As described, achievement of a mobile computing function is difficult when the display section has such a scale that inhibits simultaneous display of the display content and that restricts the numbers of digits and rows to be displayed.

In order to increase the surface area of the display portion 27, the key portion 26 is formed on the subsidiary case 22. The display portion 27 is formed on a substantially entire surface of the main case 21. In order to satisfy a requirement of the thickness of the card-shaped device, the key portion 26 comprises a flat switch using a touch screen film known in the art. The names of keys are depicted on a surface of the switch by printing or the like.

When the portable telephone apparatus 60 of the above-mentioned structure is used, the data communication can be carried out in the manner substantially similar to the portable telephone apparatus 20 that is described with reference to FIGS. 2 through 6.

Figure 8:
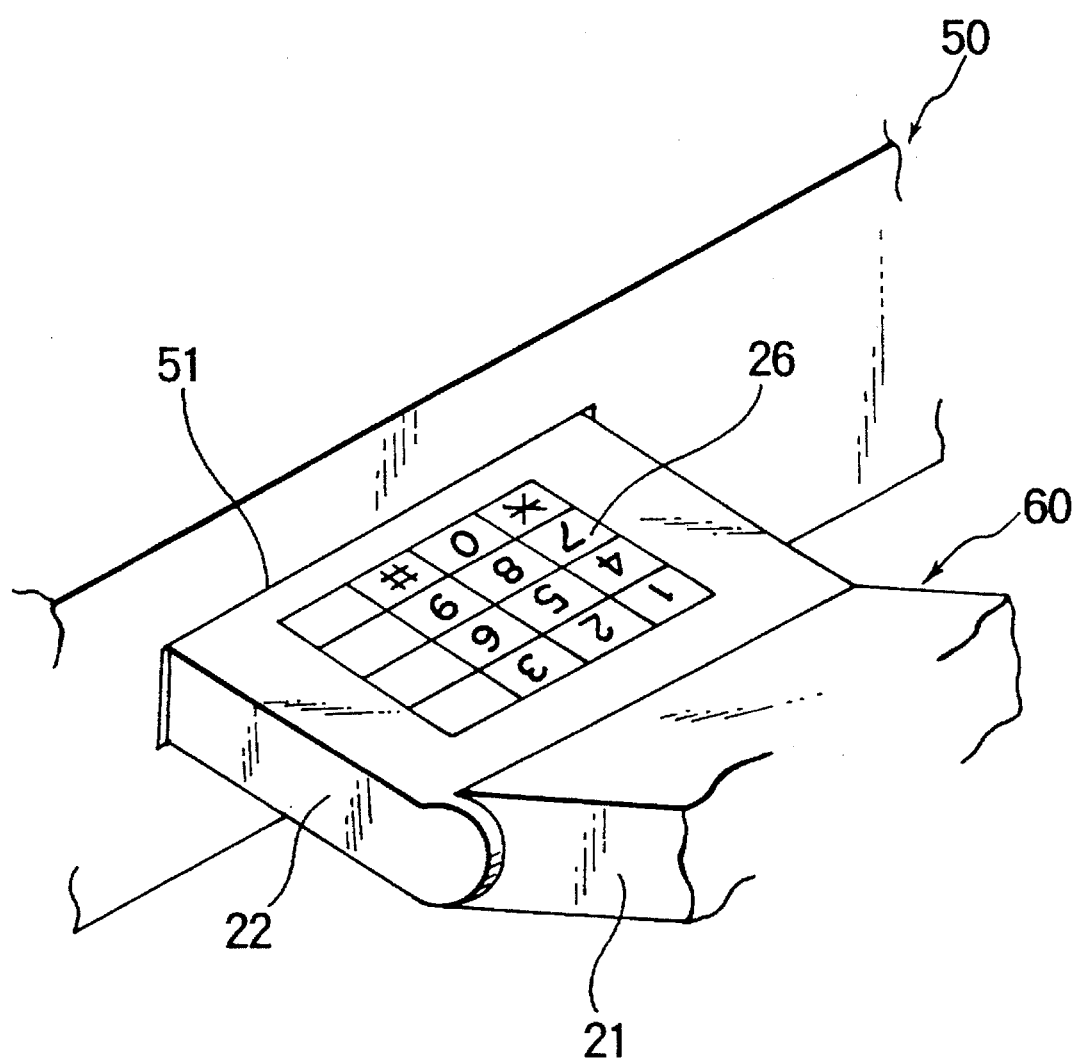
FIG. 8 is a perspective view of a state in which the data processing apparatus is connected to the portable telephone apparatus illustrated in FIG. 7.

When the subsidiary case 22 of the portable telephone apparatus 60 is inserted into the card insertion hole 51 of the data processing apparatus 50, the key portion 26 may possibly be located within the card insertion hole 51 to become unmanipulatable. In view of the above, it is required to arrange the key portion 26 in an area which is not inserted into the card insertion hole 51 as illustrated in FIG. 8.

Alternatively, manipulation of the key portion 26 in the portable telephone apparatus 60 may be carried out by manipulation keys of the data processing apparatus 50 as a substitute therefor. A further alternative arrangement comprises the steps of manipulating the key portion 26 of the portable telephone apparatus 60 to establish the channel in advance, thereafter connecting the portable telephone apparatus 60 to the data processing apparatus 50, and subsequently manipulating the data processing apparatus 50 to control communication. Thus, it is possible in the portable telephone apparatus 60 to increase the numbers of digits and rows of the display in the display portion 27. This makes it possible to realize the mobile computing function.

Figure 9:
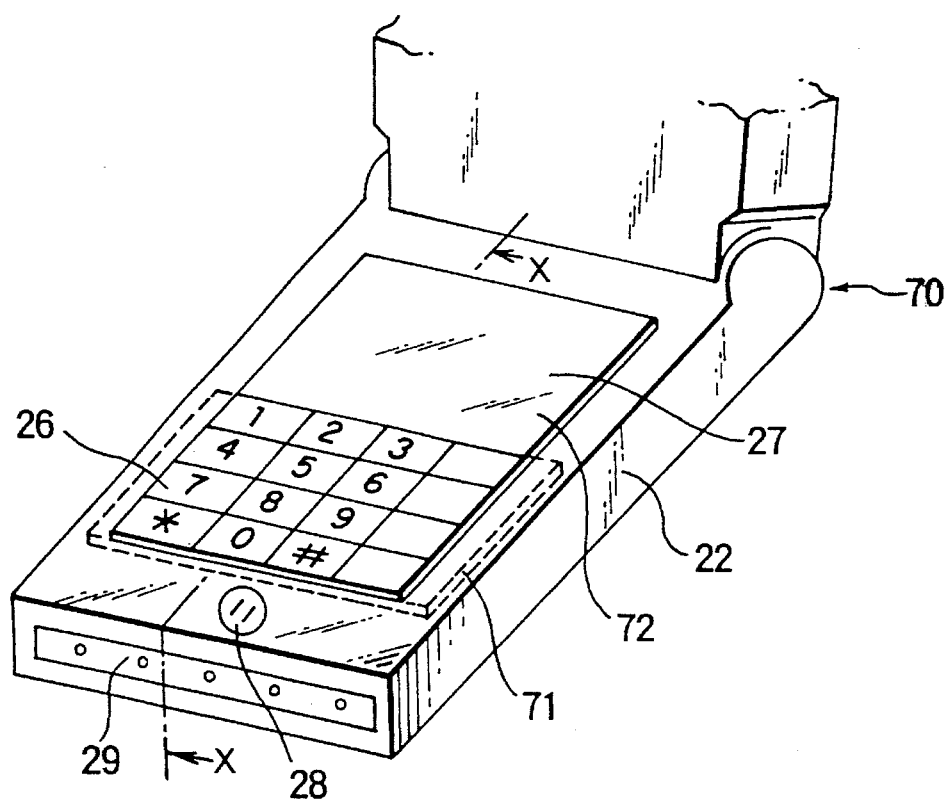
FIG. 9 is a perspective view of a part of a telephone apparatus according to a third embodiment of this invention.
Figure 10:
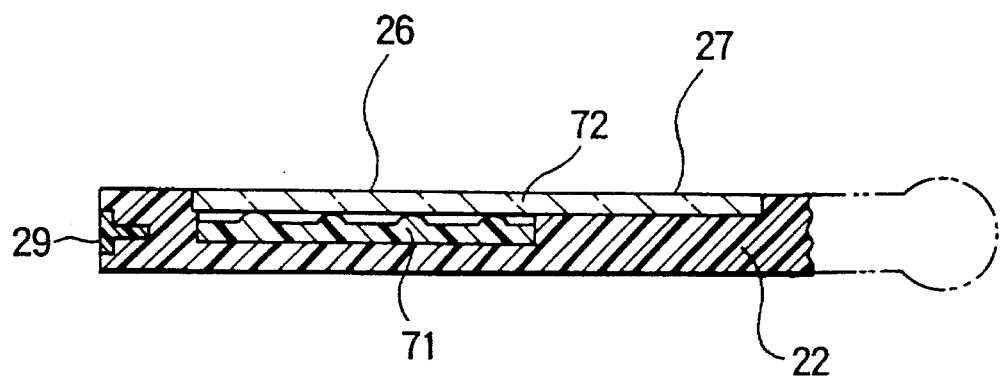
FIG. 10 is a sectional view taken along a line X—X in FIG. 9.

Turning to FIGS. 9 and 10, the description will be directed to a portable telephone apparatus 70 according to a third embodiment of this invention. Similar parts are designated by like reference numerals. The key portion 26 comprises a touch screen film 71 and a liquid crystal device 72. The liquid crystal device 72 forms a part of the display portion 27. Specifically, the liquid crystal device 72 of a greater area is superposed on the touch screen film 71. On one hand, the liquid crystal device 72 provides an indication of keys implemented by the touch screen film 71 to form the key portion 26. On the other hand, the liquid crystal device 72 is independently used to form the display portion 27. With this structure, a combination of the liquid crystal device 72 and the display portion 27 provides an extremely large display area. It is therefore possible to further increase the number of digits and rows which can be displayed.

While the present invention has thus far been described in connection with a few embodiments thereof, it will readily be possible for those skilled in the art to put this invention into practice in various other manners. For example, the invention is applicable to the telephone apparatus with the subsidiary case drawable from the main case. Alternatively, use may be made of an integral-type case without any distinction between the main case and the subsidiary case. In this event, a part of the case is formed to have a width and a thickness corresponding to those of the card-shaped device. The telephone side connector is equipped at a part which is inserted into the card insertion hole of the data processing apparatus. It will be understood that the portable telephone apparatus can be connected to any apparatus which are called a word processor and an electronic pocketbook.

What is claimed is:

1. A portable telephone apparatus having a function for use in combination with a data processing apparatus which is for processing a datum, said data processing apparatus including a card connecting portion which is for connecting a card-shaped device therewith to enable said datum to be transferred between said data processing apparatus and said card-shaped device, said portable telephone apparatus comprising:

- a card-shaped portion for being connected to said card connecting portion instead of said card-shaped device, said card connecting portion enabling said datum to be transferred between said data processing apparatus and said card-shaped portion when the card-shaped portion is connected to said card connecting portion; and
- communication carrying out means connected to said card-shaped portion for carrying out communication relating to said datum.

2. A portable telephone apparatus as claimed in claim 1, said card-shaped device being formed in accordance with a predetermined standard, wherein said card-shaped portion is formed in accordance with said predetermined standard and is connected to said card connecting portion and said communication carrying out means.

3. A portable telephone apparatus as claimed in claim 2, said card connecting portion having an insertion hole which is for being inserted with said card-shaped device in a predetermined direction when said card-shaped device is connected to said card connection portion, wherein said card-shaped portion is connected to said card connecting portion with being inserted into said insertion hole in said predetermined direction.

4. A portable telephone apparatus as claimed in claim 3, said card connecting portion including a processing side connector within said insertion hole, wherein said card-shaped portion comprises:

- a card-shaped case having an outer peripheral surface which is equal to that of said card-shaped device in size of a sectional plane perpendicular to said predetermined direction, said card-shaped case being inserted into said insertion hole when said card-shaped portion is connected to said card connecting portion; and
- a telephone side connector held to said card-shaped case for being electrically connected to said processing side connector when said card-shaped case is inserted into said insertion hole.

5. A portable telephone apparatus as claimed in claim 4, further comprising a body case which is connected to said card-shaped case for containing said communication carrying out means therein.

6. A portable telephone apparatus as claimed in claim 5, wherein said card-shaped case is movable relative to said body case.

7. A portable telephone apparatus as claimed in claim 5, wherein said card-shaped case has a first and a second end portion which are opposite to each other in said predetermined direction, said telephone side connector being held to said first end portion, said second end portion being pivotally connected to said body case.

8. A portable telephone apparatus as claimed in claim 5, further comprising:

- a display portion electrically connected to said communication carrying out means and placed on said body case; and
- a key portion electrically connected to communication carrying out means and placed on said body case.

9. A portable telephone apparatus as claimed in claim 5, further comprising:

- a display portion electrically connected to said communication carrying out means and placed on said body case; and
- a key portion electrically connected to said communication carrying out means and placed on said card-shaped case.

10. A portable telephone apparatus as claimed in claim 5, further comprising:

- a display portion electrically connected to said communication carrying out means and placed on said card-shaped case; and
- a key portion electrically connected to said communication carrying out means and placed on said card-shaped case.

11. A portable telephone apparatus as claimed in claim 10, wherein said display portion and said key portion are mechanically coupled to each other.

* * * * *